Patented July 30, 1940

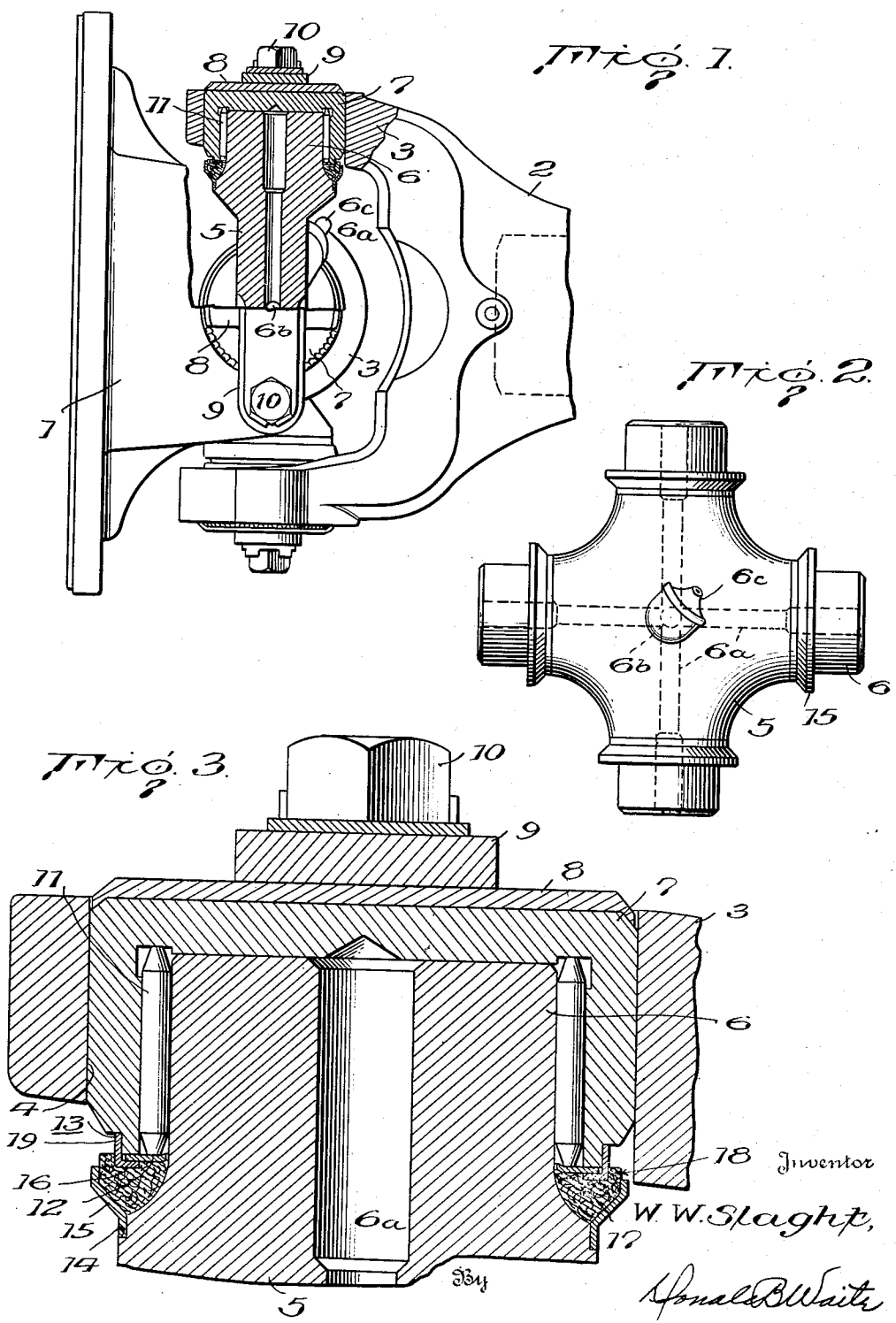

2,209,855

UNITED STATES PATENT OFFICE 2,209,855

UNIVERSAL JOINT

William W. Slaght, Rocky River, Ohio, assignor to Cleveland Steel Products Corp., Cleveland, Ohio, a corporation of Ohio Original application October 18, 1938, Serial No. 235,648. Divided and this application February 8, 1940, Serial No. 317,952

3 Claims. (Cl. 64—17)

This invention relates to universal joints, more particularly to universal joints of the trunnion type, and is a division of my copending application, Serial No. 235,648, filed October 18, 1938, for Universal joint.

Heretofore, it has been the practice in many commercial constructions of trunnion type universal joints to provide a cup shaped seal retaining member which overlapped the leak point, that is, such member overlapped the bearing cup or journal, the purpose of which was to exclude dirt and foreign particles from the leak point. In such constructions it was necessary to circumferentially space the retaining member from the bearing cup in order to avoid wear of the retaining member due to friction. Such constructions worked satisfactorily when the vehicle employing the construction was in operation to exclude dirt and foreign particles. However, it has been found that when the vehicle is not in operation, especially after a stop from driving on wet or muddy roads, that water dripping from various parts of the joint would drain into the circumferential space provided by the particular retaining member which is upright or partially so, and carry with it dust and foreign particles or other gritty material, and as the moisture evaporated or disappeared, such particles or gritty material would be left clinging to the oily retainer and would gradually work through the leak point to the trunnion bearing surfaces and cause undue wear.

The principal object of the present invention is to provide a universal joint with new and improved means for sealing the leak point thereof.

Another object is to provide a universal joint with sealing means of new and improved, yet simple, construction for excluding dirt and foreign particles from the trunnion bearing surfaces of the joint.

A further object is to provide a universal joint with a sealing means or grease retainer which is so constructed and arranged that it also overlaps the leak point of the joint trunnions.

With the above and other objects in view, which will be apparent from the following description, the present invention consists in certain features of construction and combinations of parts to be hereinafter described with reference to the accompanying drawing and then claimed.

In the drawing, which illustrates suitable embodiments of the present invention, Figure 1 is a side elevation of a universal joint incorporating the present invention, portions of the same being broken away to show one of the trunnions and bearing means;

Figure 2 is a plan view of the trunnion cross, showing the seal retainers thereon; and Figure 3 is an enlarged fragmentary view showing a bearing cup, one of the trunnions and lubricant retainers in greater detail.

Referring to the drawing in which like numerals refer to like parts throughout the views, the universal joint comprises yoke elements 1 and 2, respectively, each having yoke arms 3 provided with a bearing cup aperture 4 therein, a trunnion cross 5 having trunnions 6 arranged at ninety degrees with respect to each other which are arranged, as is well known, to lie within the apertures 4, and bearing cups 7 fitting within the apertures 4 to surround the trunnions 6.

In the construction shown, the trunnions 6 have end thrust engagement with the ends of the bearing cups 7, which cups are held against outward axial movement by members 8 engaging the end faces of the trunnions which are held in place by bars 9 secured by means of cap screws 10 to each yoke arm 3 at opposite sides of the aperture 4 thereof. This particular bearing cup retaining means is of the character shown in my United States Letters Patent 2,114,861, dated April 19, 1938, and forms no part of the present invention.

Also, in the construction shown, I have provided, as is conventional practice, a series of small rollers 11 between the trunnions and the bearing cups 7, which rollers are held in place by annular plates 12 of sheet metal clamped against the open ends of the bearing cups 7 by means of annular stampings 13 of L-shaped section having a pressed fit engagement with the open ends of the bearing cups. It is to be understood that solid bearings or bushings may be used in place of the small rollers 11.

Lubrication of the joint is provided by forming the trunnion cross 5 with intersecting axial passages 6a opening through the trunnion ends and intersecting at 6b at the center of the 5, the intersection or opening 6b being provided with a filler fitting 6c of any suitable type.

Referring to Figure 3, in particular, the trunnion cross 5 is provided at the base of each trunnion 6 with a shoulder 14 and fitted on this shoulder, preferably with a press fit, is an annular shell 15 of sheet metal which provides an annular channel at the base of the trunnion. The plane of the open end of the shell 15 is substantially coincident with the plane of the shorter flange 16 of the L-shaped stamping 13, although, these planes, if desired, may be slightly spaced apart, but not overlapping.

Arranged within this channel, to surround the trunnion 6, is the lubricant retaining member 17, which is preferably of cork material. The member 17 closely engages the shorter flange 16 of the stamping 13 to prevent the leakage of lubricant from the bearing cup 7, as in conventional universal joint practice. Preferably, the lubricant retaining member 17 is under a slight compression. In the present invention, the lubricant retaining member 17 is provided with a peripheral annular flange 18 which projects beyond the sheet metal retainer or shell 15 and overlaps the longer flange 19 of the stamping 13 with close engagement therewith. If desired, the grease retaining member 17 may be of such thickness that when the bearing cup 7 is assembled that it is forced into the cross sectional shape shown in the drawing.

In this construction it is to be noted that no annular pocket is provided by the retaining shell 15, as in conventional present day constructions, which will catch water and dirt and foreign particles dripping from the joint when it is not in operation. Any water dripping from the joint of the present construction will immediately pass over the annular portion 18 of the grease retainer or packing 17 carrying any dirt or foreign particles with it so that they will not gain access to the bearing surfaces through the leak point by friction between the lubricant retainer 17 and the shorter flange 16 of the L-shaped stamping 13.

It is to be noted that the shell 15 instead of being cylindrical tapers outwardly from the shoulder 14 to a diameter slightly less than diameter of the aperture 4. By so tapering the shell 15, dirt and foreign particles thrown outwardly by centrifugal force during rotation of the universal joint are caused to be deflected and thrown away from the end portion of the bearing cup 7, thereby minimizing the collection to dirt and dust particles adjacent the packing member 17.

In the construction shown, I have provided an advantageous universal joint construction in which improved means is provided for deflecting dirt and foreign particles away from the relatively movable parts thereof, and improved means for preventing access of dirt and foreign particles to the working parts, whereby wear due to foreign material is eliminated and the joint life will be prolonged.

Although a specific embodiment of the present invention has been shown and described, it will be evident that various changes may be made in the form, number and arrangement of parts within the spirit and scope of the invention, as defined in the appended claims.

What I claim is:

1. In a universal joint apparatus having a plurality of trunnions and bearing cups surrounding said trunnions with the open ends thereof adjacent the bases of their associated trunnions, the combination with each said bearing cup and associated trunnion of lubricant sealing means, comprising an annular shell mounted on the base of said trunnion and extending axially substantially to the transverse plane of the open end of the bearing cup, but not beyond said plane, to provide an annular channel opening toward said open end, and an annular lubricant sealing packing within said channel in engagement with said open end, trunnion and shell and having an annular flange portion projecting axially beyond said shell in overlapping close fitting continuous engagement with the external surface of said bearing cup.

2. In a universal joint apparatus having a plurality of trunnions and bearing cups surrounding said trunnions with the open ends thereof adjacent the bases of their associated trunnions, the combination with each said bearing cup and associated trunnion of lubricant sealing means, comprising an annular shell mounted on the base of said trunnion and extending axially substantially to the transverse plane of the open end of the bearing cup, but not beyond said plane, to provide an annular channel opening toward said open end, and an annular lubricant sealing packing within said channel in engagement with said open end, trunnion and shell and having an annular flange portion projecting axially beyond said shell in overlapping close fitting continuous engagement with the external surface of said bearing cup, said annular shell tapering outwardly from the base to a diameter slightly less than the external diameter of the bearing cup.

3. In a universal joint apparatus, a plurality of trunnions, each having a base portion of increased diameter, bearing cups surrounding said trunnions and having their open ends facing said base portions, the external surface of each of said bearing cups being of reduced diameter at the open end thereof, and lubricant sealing means for each of said bearing cups and associated trunnion, comprising an annular shell carried by the base portion of the trunnion and extending axially toward the bearing cup but terminating substantially at the plane of the open end of said cup and a lubricant sealing packing confined about said trunnion and within said shell in engagement with said open end, said packing having an annular portion extending beyond said shell and closely circumferentially engaging said surface of reduced diameter.

WILLIAM W. SLAGHT.